United States Patent [19]

Adell

[11] 4,437,916
[45] Mar. 20, 1984

[54] METHOD OF MANUFACTURING EDGE GUARDS

[75] Inventor: Robert Adell, Novi, Mich.

[73] Assignee: U.S. Product Development Company, Sunnyvale, Tex.

[21] Appl. No.: 323,510

[22] Filed: Nov. 23, 1981

[51] Int. Cl.³ .................. B31F 1/00; B29C 19/00; B32B 31/00; B23P 14/00
[52] U.S. Cl. .................. 156/222; 156/201; 49/462; 29/423; 29/469.5; 52/716
[58] Field of Search .......... 156/201, 200, 199, 323, 156/289, 212, 219, 222; 29/418, 423, 424, 469.5, 505, DIG. 3, DIG. 30; 428/31, 133, 136; 52/716, 717, 718; 49/462, 394, 466; 292/251.5, 256; 156/293, 214, 213, 224, 303.1

[56] References Cited

U.S. PATENT DOCUMENTS

| | | | |
|---|---|---|---|
| 2,851,757 | 9/1958 | Pender | 52/718 |
| 3,068,136 | 12/1962 | Reid | 156/200 |
| 3,354,015 | 11/1967 | Klusmire et al. | 156/323 |
| 4,028,794 | 6/1977 | Ritchie et al. | 156/200 |
| 4,220,681 | 9/1980 | Narita | 428/31 |
| 4,313,985 | 2/1982 | Narita | 428/31 |
| 4,330,498 | 5/1982 | Kleykamp et al. | 156/293 |
| 4,338,148 | 7/1982 | Adell | 156/222 |

Primary Examiner—Edward C. Kimlin
Assistant Examiner—Louis Falasco
Attorney, Agent, or Firm—Stephenson & Boller

[57] ABSTRACT

An improved method of manufacturing an insulated metallic edge guard, such as a door edge guard, comprises applying an insulating layer to one side of the metal strip which remains on the strip for protecting and insulating the edge guard from the object on which it is installed when in use, applying a protective layer to the opposite surface of the metal strip for the purpose of protecting the appearance of the strip during manufacturing, forming the laminated metal strip into a U-shaped cross section of desired configuration and then stripping the protective layer which is on the exterior of the U-shaped cross section from the door edge guard to expose the exterior of the metal to view.

2 Claims, 4 Drawing Figures

METHOD OF MANUFACTURING EDGE GUARDS

BACKGROUND AND SUMMARY OF THE INVENTION

This invention relates to a method of manufacturing ornamental and protective edge guards which are applied to the edges of sheet metal panels of automotive vehicles, such as the doors.

Edge guards are applied to the trailing edges of the vehicle's doors to protect the door edges from damage which might be caused by striking an object which may be present in a door's path when the door is opened. It is often desirable for such door edge guards to be made of bright metal such as stainless steel, aluminum, or bimetal, due to the excellent protective and ornamental character of such material. Furthermore, the inherent strength and resiliency of metallic edge guards enable them to be self-retaining on the doors. Correspondingly it is generally undesirable to use separate fasteners or adhesives in securing door edge guards to doors since they involve extra costs in labor and materials. It is also generally undesirable to use strictly non-metallic guards such as plastic edge guards since they do not possess the excellent protective, ornamental, and self-retention characteristics of bright metallic edge guards. In connection with the usage of self-retaining edge guards, it has heretofore been recognized that the potential for paint scratching and marring exists when the metal edge guards are applied to vehicle door edges. Such paint scratching can lead to premature corrosion of the door edge metal.

Some of applicant's inventions have addressed this matter of possible paint scratching and have provided solutions. Applicant has also recognized that electrochemical corrosion is a potential problem where the metal of the vehicle door and the metal of the edge guard are dissimilar. Some of applicant's own inventions have addressed this problem and provided solutions. References made to applicant's U.S. Pat. Nos. 2,704,687 and 4,259,812 as well as pending patent application Ser. Nos. 118,475 now U.S. Pat. No. 4,334,700; 132,525 now U.S. Pat. No. 4,316,340; 194,747 now U.S. Pat. No. 4,338,148; 194,748 now U.S. Pat. No. 4,365,450; 194,749 now U.S. Pat. No. 4,377,056; 216,483; and 216,860 now U.S. Pat. No. 4,387,125.

These prior inventions involve the use of plastic liners to insulate the metal edge guards from the vehicle door. The liners may be extruded plastic, plastic encapsulation, foam plastic, or plastic film by way of example.

In particular, reference is made to pending application Ser. No. 194,747. That application now U.S. Pat. No. 4,338,148 discloses an improvement in a method of manufacturing a door edge guard of the above described type. The invention of that application involves the application of an insulating layer such as a plastic material, to a strip of metal. The laminate thus formed is further processed by roll forming procedures to produce a door edge guard having a generally U-shaped cross section. The insulating layer forms a liner for the interior of the U-shaped section and the bright metal is exposed on the exterior to provide a bright finished appearance; yet the product is possessive of the excellent retention and protective character which are best for use on the edges of swinging closures such as the vehicle's doors. Also disclosed in application Ser. No. 194,747, as well as in certain other of the above identified applications of applicant, is a door edge guard cross section in which the insulating layer is brought around the distal edges of the legs of the U-shaped cross section so as to appear as a thin band on the exterior front edges of the legs. The preferred insulating layer is a dark vinyl. Hence the resultant construction, in addition to its functional attributes, is particularly attractive in that it provides the bright metal appearance in conjunction with a thin dark colored band running along the front edge.

The fabrication of such an insulated metallic door edge guard is particularly convenient in that the layer of insulation is applied to the metal strip before it is roll formed and this saves on having to individually form the liner to a particular cross section separately from the roll forming of the metal strip into the U-shaped cross section.

Applicant has observed that in the manufacture of the type of edge guard containing his earlier invention, a further improvement upon the manufacturing process can be made by including a further layer of lamination with the further layer being applied to the opposite side of the metal strip from that side to which the insulating layer is applied. Hence during the roll-forming procedure all three elements of the lamination, namely the metal strip, the insulating liner and the further layer are all formed to basically the same cross sectional shape. At such a time as desired, for example when the edge guard is put to use, the further layer is stripped from the edge guard to expose the bright metal exterior of the metal strip. Accordingly the further layer serves the purpose of protecting the bright metal of the metal strip during the roll forming process. It can also protect the bright metal during shipment until such time as the edge guard is put to use as installed on a vehicle.

The further layer constitutes a release liner which can be readily removed from the edge guard anytime after manufacture even up to the point at which the edge guard is put to its installed end use. For example a release paper having a release adhesive is a suitable construction for this further release liner. In this way the release paper protects the bright metal against scratching or marring which might otherwise occur during the roll forming process.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
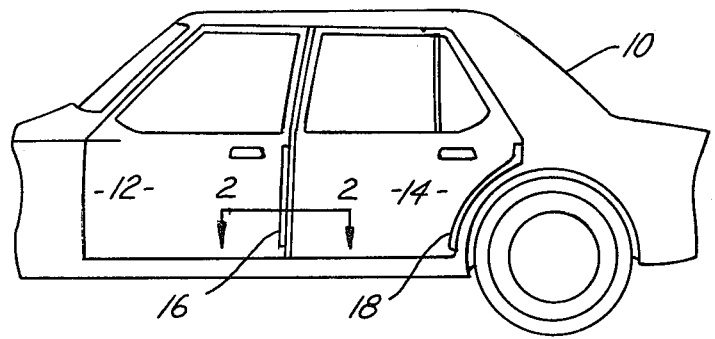
FIG. 1 is a fragmentary side elevational view of an automotive vehicle containing a door edge guard which has been manufactured in accordance with the method of the present invention.

FIG. 1 shows a portion of an automobile 10 comprising front and rear doors 12 and 14 on the trailing edges of which are applied door edge guards 16 and 18 which have been manufactured in accordance with the present invention. The edge guards are generally elongate and essentially coextensive in length with the trailing edges of the doors, each edge guard conforming to the contour of the trailing edge of its door. It will be appreciated that the actual length of an edge guard may be some what less than the length of the trailing door edge and therefore that the drawing is merely exemplary. Moreover, the edge guards may be notched at selected locations as required in accordance with the prevailing manufacturing practice. For example in the case of the rear edge guard 18 it would be notched at the transition from the lower curved segment to the short straight upper segment and possibly at whatever character lines may be present in the sheet metal of the door.

Figure 2:
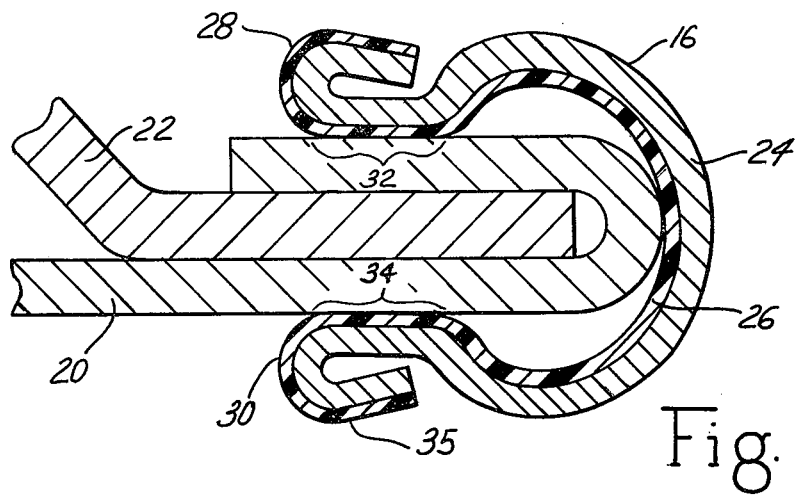
FIG. 2 is an enlarged horizontal cross sectional view taken in the direction of arrows 2—2 of FIG. 1.

FIG. 2 illustrates door edge guard 16 in cross section where it can be seen that the edge guard is applied over the trailing door edge. In accordance with the prevailing method in construction of automobile doors, each door comprises an outer metal panel 20 and an inner sheet metal panel 22. The trailing door edge comprises the outer panel 20 being wrapped around and suitably secured to the inner panel 22, as shown. The total overall thickness of the trailing edge of door is subject to a rather substantial tolerance and the edge guard is dimensioned to accommodate variations in door edge thickness with the physical characteristics of the materials, particularly flexing and resiliency, allowing the suitably dimensioned edge guard to be self-retaining on a range of the door edge thicknesses within the tolerance limits. The doors are typically primed and painted steel, and if chipped or scratched to the bare metal, are susceptible to corrosion. The chipped paint itself detracts from the appearance of the door.

In door edge guard serves to protect the door edge from such chipping, scratching, and marring when in use. The illustrated door edge guard is especially well suited for protective and ornamental purpose because it relies upon the retention characteristics of a metal U-shaped channel for being self-retaining and at the same time the metal provides protection to the door edge from blows which may occur to it.

The edge guard comprises a metal channel 24 and an insulating layer 26 which is preferably a laminated vinyl sheet. The insulating layer 26 lines the full interior of the metal edge guard 24 so that the dissimilar metals of the edge guard metal 24 and the door are rendered immune to electrochemical action between themselves. The liner may also provide a certain resiliency or cushioning which is useful in protecting the door edge from damage in response to blows. The U-shaped channel may be considered as having inner and outer legs disposed on the inner and outer sides of the door edge. The legs include insulated metal beads, 28 for the inner leg, and 30 for the outer leg, at the distal ends. These beads run the full length of the edge guard and are formed by outwardly reverse turning the extreme distal margin of the metal strip and laminated insulating layer so that the construction has two thicknesses of metal. The two thicknesses of metal provide a rigidifying structure to the edge guard allowing a better application of retention force to the edge of the door. The retention force is applied to the door on opposite sides along the flat portions indicated by the reference numerals 32 for the inner leg and 34 for the outer leg; the insulating layer also being disposed between the metal edge guard and the door edge.

The beads thus formed also provide for a portion for the insulating material to be exposed to view when the edge guard is installed. Particularly the reference numeral 35 indicates a thin band of insulating material which runs lengthwise of the edge guard so that when viewed on the vehicle, the edge guard presents a metallic appearance in conjunction with a thin band or strip of insulating material running along the forward edge of the outside leg. By making the insulating layer of a suitable material such as a dark colored vinyl (black, brown or navy), a particularly attractive appearance is presented while the edge guard still possesses excellent retention, protection and insulation characteristics. The illustrated cross section is developed in manufacturing processes through the use of roll forming procedures.

Figure 3:
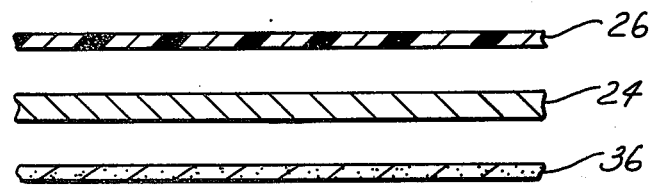
FIG. 3 is an exploded perspective view illustrating one step of the manufacturing process.

FIG. 3 illustrates the starting point in the manufacturing process and indicates that the metal edge guard 24 begins as a flat strip of material. The insulating liner 26 is applied to one of the major surfaces of the metal strip, preferably covering and being adhered to the entire extent of that surface, although it will be appreciated that it may not necessarily fully cover the metal strip and it need not be applied in full surface-to-surface contact over the full extent of the metal strip surface. In accordance with the manufacturing procedure which is described and claimed in the aforementioned pending application Ser. No. 194,747 now U.S. Pat. No. 4,338,148, the laminate formed by the metal strip 24 and the insulating layer 26 is roll formed to the desired cross sectional shape. However, in accordance with principles with the improvement afforded by the present invention there is further applied to the metal strip a release liner 36 which is applied to the major surface of the metal strip opposite that to which the insulating liner 26 is applied. The release liner 36 may be any suitable material such as paper which is applied to the metal strip and will remain on the metal strip so as to protect the metal strip during the roll forming procedure. The material is also readily strippable after completion of roll forming so that the bright exterior of the metal can be exposed to view when the edge guard is put to use. For example the release liner 36 may be a paper which includes an adhesive which is sufficient to retain the release paper on the metal during roll forming yet which allows the release liner to be stripped (along with the adhesive) after the roll forming procedure is completed. It is further possible that the protective paper remain on the edge guard during shipment from the supplier's plant to the automotive assembly plant and thereby it can serve a useful purpose to protect the material even after the manufacturing roll forming procedures are completed. It is therefore possible that the production parts can be packaged for shipment without more elaborate procedures which might otherwise be required.

Figure 4:
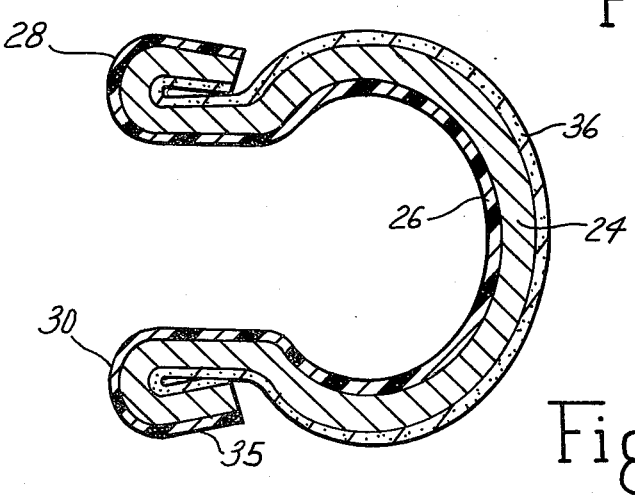
FIG. 4 is a cross sectional view similar to FIG. 2 illustrating the completed edge guard by itself after the manufacturing process.

FIG. 4 illustrates the cross sectional shape after the roll forming process has been completed but before the release paper 36 has been stripped from the completed product. The resultant product has a double fold of release paper between the double thicknesses of metal at the inner and outer beads 28 and 30. Because this portion of the edge guard is not exposed to view it might be possible for the release paper to be less than the full width of the strip so that the double thickness of insulating paper between the double thicknesses of metal does not result.

The release paper can be stripped by freeing an edge or corner of the paper and then pulling it away from the metal.

Hence the improvement of the present invention means that the exterior surface of the bright metal is fully protected during roll forming. This has the advantages of reducing scrap and eliminating rework or refinishing of edge guards due to damage which might be occasioned by roll forming. The release paper can also protect the edge guard during shipment and hence can eliminate the need to rework an edge guard which has been damaged in shipment. Thus the invention provides a useful improvement in the manufacturing of ornamental and protective door edge guards. While a preferred embodiment has been disclosed it will be appreciated that principles of the invention are applicable to other embodiments as well.

What is claimed is:

1. The method of making an insulated, self-retaining metallic edge guard of the type comprising a metal channel of generally U-shaped cross section having an interior and an exterior and inner and outer legs, including beads at distal ends of the legs, via which self-retention forces are applied to an edge of an object on which the edge guard is to be installed, and protective insulation on the interior of the channel to insulate the metal of the channel from an edge of the object on which the edge guard is to be installed and with the exterior of the channel being exposed to view when in use, said insulated metallic edge guard being made from a strip of metal on one side of which the protective insulation is applied to completely cover said one side, said method comprising applying a protective layer of a material different from that of said protective insulation to a side of the metal strip opposite that to which the protective insulation is applied to thereby completely cover said other side, roll forming the strip, including the protective insulation and the protective layer into a U-shaped cross section of desired configuration to form said inner and outer legs and to form said beads by outwardly reversing the distal ends of the legs so that the protective insulation lines the entire interior of the U-shaped channel, and the protective layer the entire exterior except at said beads where the protective insulation, instead of the protective layer, is visible on the exterior of the roll-formed edge guard, and then when the edge guard is put to use, removing the protective layer from the exterior of the channel to reveal the metal of the channel to view.

2. The method set forth in claim 1 wherein the protective insulation is a vinyl plastic and the protective layer is a release paper.

* * * * *